US012614270B2

(12) United States Patent
Korjani et al.

(10) Patent No.: US 12,614,270 B2
(45) Date of Patent: Apr. 28, 2026

(54) MACHINE LEARNING SYSTEM FOR NATURAL GAS LEAK DETECTION

(71) Applicant: Clean Connect AI, Inc., Windsor, CO (US)

(72) Inventors: Mehdi Korjani, Pasadena, CA (US); David A. Conley, Berthoud, CO (US); Mark Smith, Gilbert, AZ (US)

(73) Assignee: Clean Connect AI, Inc., Windsor, CO (US)

( * ) Notice: Subject to any disclaimer, the term of this patent is extended or adjusted under 35 U.S.C. 154(b) by 343 days.

(21) Appl. No.: 18/327,153

(22) Filed: Jun. 1, 2023

(65) Prior Publication Data

US 2024/0029232 A1      Jan. 25, 2024

Related U.S. Application Data

(60) Provisional application No. 63/391,908, filed on Jul. 25, 2022.

(51) Int. Cl.
*G06T 7/00* (2017.01)
*G06V 20/40* (2022.01)
*G06V 20/52* (2022.01)

(52) U.S. Cl.
CPC ............ *G06T 7/0004* (2013.01); *G06V 20/46* (2022.01); *G06V 20/52* (2022.01); *G06T 2207/10016* (2013.01); *G06T 2207/10048* (2013.01)

(58) Field of Classification Search
CPC ......... G06T 7/0004; G06T 2207/10016; G06T 2207/10048; G06T 2207/10024; G06T 2207/20081; G06T 2207/20084; G06V 20/46; G06V 20/52; G06V 10/56; G06V 10/62; G06V 20/40
See application file for complete search history.

(56) References Cited

U.S. PATENT DOCUMENTS

| | | | |
|---|---|---|---|
| 10,657,443 B2 | 5/2020 | Araujo et al. | |
| 10,726,558 B2 | 7/2020 | Ruda et al. | |
| 11,609,151 B1 | 3/2023 | Collins et al. | |
| 2012/0206595 A1* | 8/2012 | Alphenaar | G06Q 10/0631 |
| | | | 702/45 |
| 2016/0284075 A1 | 9/2016 | Phan et al. | |
| 2019/0180464 A1* | 6/2019 | Kraft | G01F 22/00 |
| 2019/0354772 A1 | 11/2019 | Tasli et al. | |
| 2020/0169734 A1* | 5/2020 | Fainstain | G06T 7/246 |
| 2021/0216852 A1 | 7/2021 | Reece et al. | |
| 2021/0232741 A1 | 7/2021 | Ogiso et al. | |
| 2023/0063604 A1* | 3/2023 | Al Daif | E21B 47/117 |

(Continued)

*Primary Examiner* — Amara Abdi

(57) ABSTRACT

Various embodiments of the present technology relate to solutions for gas leak detection in natural gas extraction and storage environments. In some examples, a machine learning interface generates feature vectors based on video data that depicts a natural gas storage facility and feeds the feature vectors to a machine learning engine. The machine learning engine ingests the feature vectors and generates a machine learning output that indicates the presence of the gas leak in the natural gas storage facility. The machine learning interface receives the machine learning output that indicates the presence of a gas leak in the natural gas storage facility. The machine learning interface generates and transfers an alert based on the machine learning output.

20 Claims, 13 Drawing Sheets

200 ─┐

(56)                    References Cited

U.S. PATENT DOCUMENTS

| | | | |
|---|---|---|---|
| 2023/0105173 A1* | 4/2023 | Spinelli | G06V 20/44 |
| | | | 382/181 |
| 2023/0177726 A1* | 6/2023 | Spears | G06V 10/26 |
| | | | 382/100 |
| 2023/0186445 A1* | 6/2023 | DeLuca | G06T 5/77 |
| | | | 382/100 |

* cited by examiner

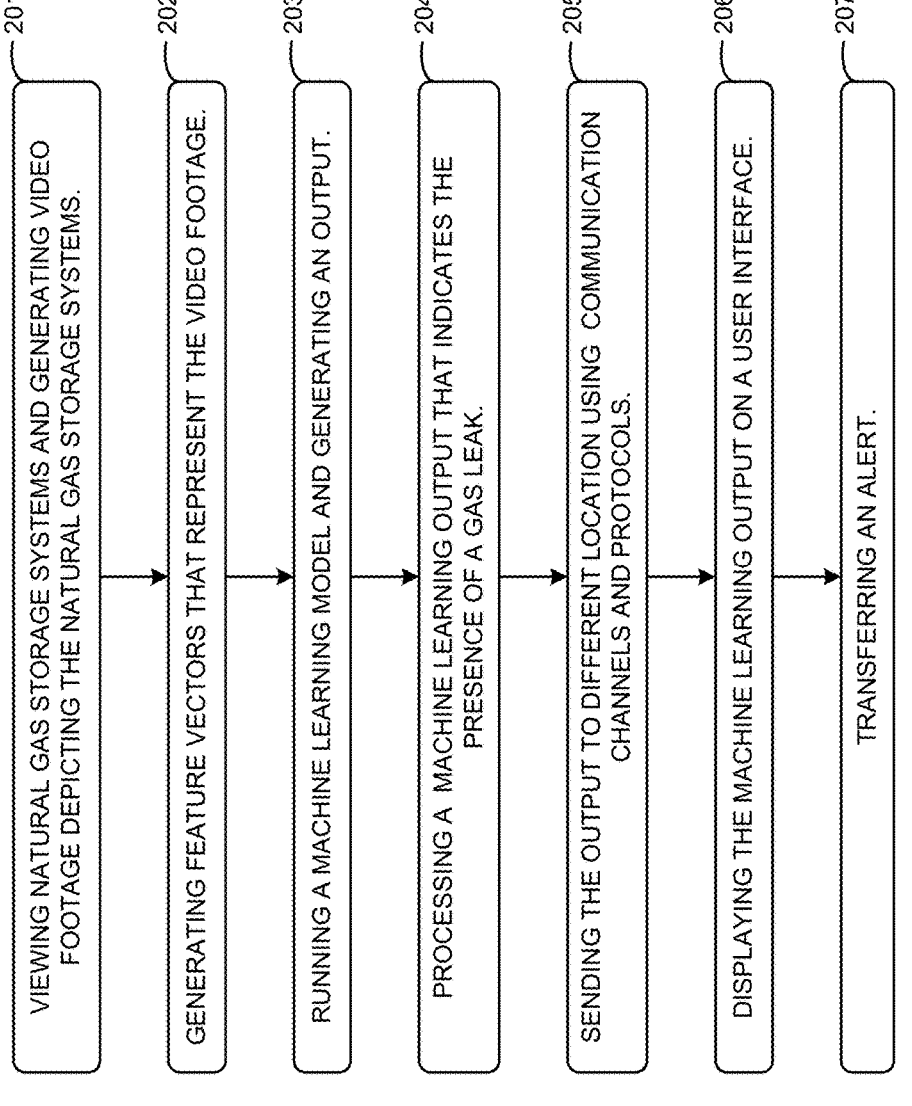

201 VIEWING NATURAL GAS STORAGE SYSTEMS AND GENERATING VIDEO FOOTAGE DEPICTING THE NATURAL GAS STORAGE SYSTEMS.

202 GENERATING FEATURE VECTORS THAT REPRESENT THE VIDEO FOOTAGE.

203 RUNNING A MACHINE LEARNING MODEL AND GENERATING AN OUTPUT.

204 PROCESSING A MACHINE LEARNING OUTPUT THAT INDICATES THE PRESENCE OF A GAS LEAK.

205 SENDING THE OUTPUT TO DIFFERENT LOCATION USING COMMUNICATION CHANNELS AND PROTOCOLS.

206 DISPLAYING THE MACHINE LEARNING OUTPUT ON A USER INTERFACE.

207 TRANSFERRING AN ALERT.

MACHINE LEARNING SYSTEM FOR NATURAL GAS LEAK DETECTION

CROSS-REFERENCE TO RELATED APPLICATIONS

This U.S. Patent Application claims priority to U.S. Provisional Patent Application 63/391,908 entitled "MACHINE LEARNING SYSTEM FOR NATURAL GAS LEAK DETECTION" which was filed on Jul. 25, 2022. U.S. Provisional Patent Application 63/391,908 is incorporated into this U.S. Patent Application in its entirety.

TECHNICAL FIELD

Various embodiments of the present technology relate to natural gas extraction technologies, and more specifically, to detecting and classifying natural gas leaks using machine learning systems.

BACKGROUND

Natural gas extraction systems comprise machinery and equipment configured to extract natural gas from underground reservoirs for use in energy generation, heating, and chemical production applications. Natural gas extraction systems comprise extraction equipment, transfer equipment, and storage equipment. The extraction equipment is configured to remove natural gas from underground gas reservoirs. Examples of extraction equipment include hydraulic fracturing devices. The transfer equipment is configured to move the natural gas between different geographic locations. Examples of transfer equipment include gas pipelines. The storage equipment is configured to store the natural gas over an extended period of time. Examples of storage equipment include bullet tanks and gasholders. The natural gas extraction systems often comprise manufacturing defects or develop defects over time which result in gas leaks. The gas leaks may result in lost revenue and environmental pollution. For example, a valve in a natural gas pipeline may develop a defect which allows gas to escape from the pipeline. Due to the large amount of extraction, transfer, and storage equipment in the natural gas extraction systems, the natural gas leaks can be difficult to detect allowing the leaks to persist over time. Moreover, natural gas leaks are difficult to view in the visible light spectrum which compounds the difficulty of spotting gas leaks.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. Some machine learning models comprise supervised learning models. A supervised machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of supervised learning machine learning algorithms is their ability to learn by example, rather than needing to be manually programmed to perform a task, especially when the tasks would require a near-impossible amount of programming to perform the operations in which they are used. Unfortunately, natural gas extraction systems do not effectively and efficiently use machine learning algorithms to detect natural gas leaks in their extraction, transfer, and storage equipment.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for leak detection systems in natural gas extraction and storage environments. Some embodiments comprise a method of operating a leak detection system to detect gaseous leaks in a natural gas storage environment. The method comprises generating feature vectors based on video data that depicts a natural gas storage facility. The method further comprises providing the feature vectors as input to a machine learning system wherein the machine learning system indicates a presence or lack thereof of a natural gas leak in the natural gas storage environment. The method further comprises generating and transferring data for rendering a user interface that comprises the indication.

Some embodiments comprise a leak detection system to detect gaseous leaks in a natural gas extraction environment. The leak detections system comprises a machine learning interface and a machine learning engine. The machine learning interface generates feature vectors based on video data that depicts a natural gas storage facility. The machine learning interface feeds the feature vectors to the machine learning engine. The machine learning engine generates a machine learning output that indicates the presence of a gas leak in the natural gas storage facility. The machine learning interface receives the machine learning output that indicates the presence of a gas leak in the natural gas storage facility. The machine learning interface generates and transfers data for rendering a user interface that comprises the indication.

Some embodiments comprise a non-transitory computer-readable medium stored thereon instructions to detect gaseous leaks in a natural gas extraction environment. The instructions, in response to execution, cause a system comprising a processor to perform operations. The operations comprise generating feature vectors based on video data that depicts a natural gas storage facility. The operations further comprise providing the feature vectors as input to a machine learning system wherein the machine learning system indicates a presence or lack thereof of a gas leak in the natural gas storage environment. The operations further comprise generating and transferring data for rendering a user interface that comprises the indication.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 illustrates an exemplary leak detection process.

Figure 1:
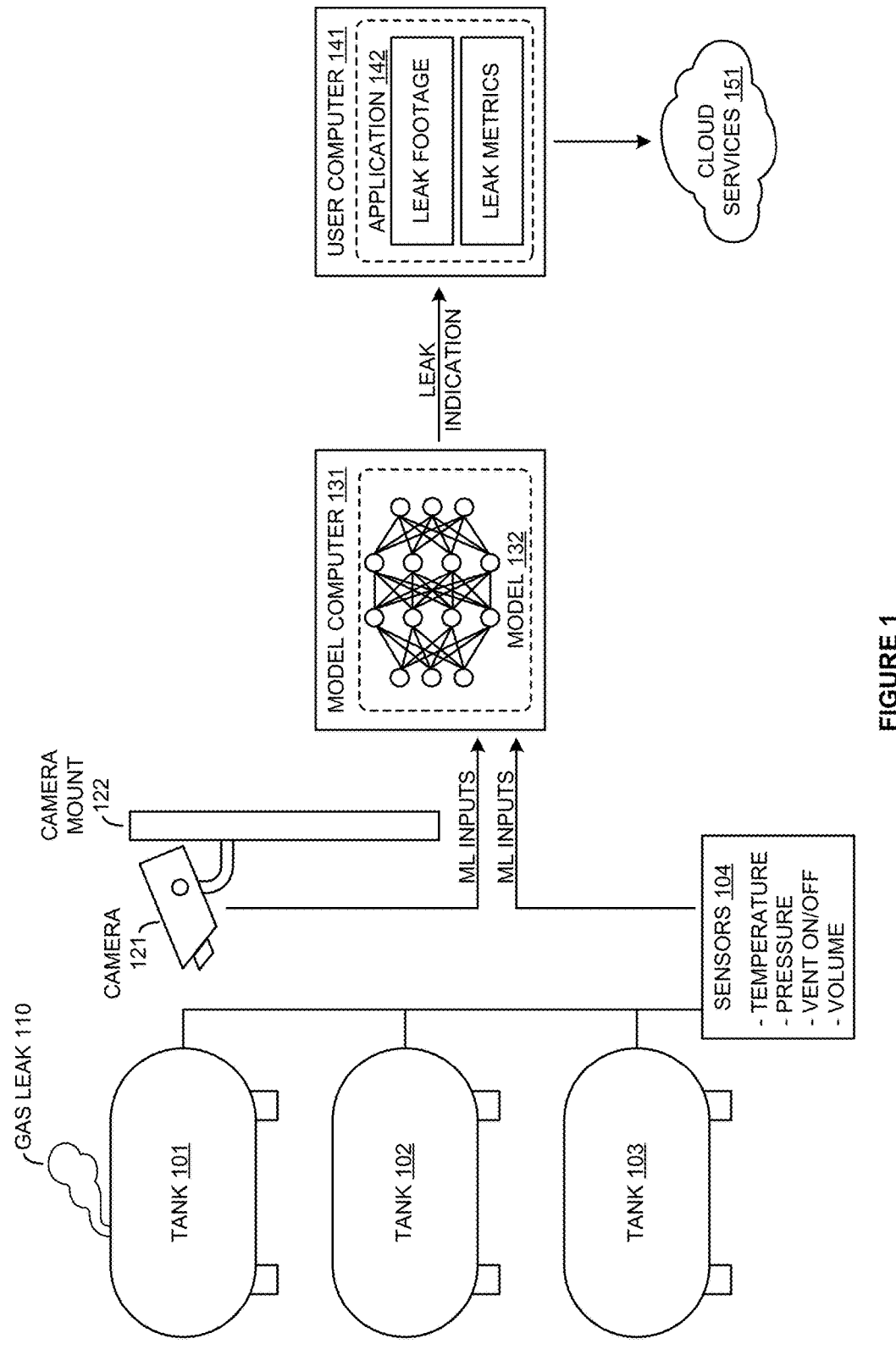
FIG. 1 illustrates an exemplary leak detection system.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates environment 100 to detect gaseous leaks in storage, transfer, and extraction equipment. Environment 100 performs services like natural gas storage, natural gas transfer, natural gas extraction, natural gas leak detection, and natural gas leak notification. Environment 100 comprises storage tanks 101-103, sensors 104, gas leak 110, camera 121, camera mount 122, model computer 131, model 132, user computer 141, application 142, and cloud services 151. In other examples, environment 100 may include fewer or additional components than those illustrated in FIG. 1. Likewise, the illustrated components of environment 100 may include fewer or additional components, assets, or connections than shown. Model computer 131 and user computer 141 may be representative of a single computing apparatus or multiple computing apparatuses.

Storage tanks 101-103 are representative of natural gas storage devices. Exemplary natural gas storage devices include bullet tanks, Liquified Natural Gas (LNG) storage tanks, gasholders, storage vehicles, and/or other types of natural gas storage systems. In some examples, environment 100 may comprise additional devices for natural gas extraction and natural gas transfer. For example, environment 100 may comprise hydraulic fracturing equipment, natural gas pipeline equipment, gas storage and transfer vehicles, and the like.

Sensors 104 are representative of telemetry devices configured to measure and report storage metrics like tank temperature, tank pressure, vent status, tank volume, tank location, tank type, and/or other types of telemetry for tanks 101-103. Exemplary telemetry devices of sensors 104 include thermometers, pressure gauges, flowrate gauges, on/off indicators, Global Positioning System (GPS) devices, and the like. Sensors 104 are operatively coupled to tanks 101-103. Sensors 104 interact with tanks 101-103 to generate telemetry data and report the telemetry data to model computer 131. Sensors 104 also provide environmental telemetry like temperature, pressure, wind speed, wind direction, clouds, visibility, humidity, dew point, and the like. The environmental telemetry metrics improve machine learning model performance (e.g., performance of model 132) and help the machine learning model better understand the condition of environments when the gas is leaking.

Gas leak 110 is representative of a natural gas outflow from storage tank 101. In some examples, gas leak 110 is the result of defect in tank 101 allowing the natural gas contained within tank 101 to leak out. The defect may comprise a crack, faulty valve, or some other type of defect that compromises the storage ability of tank. In some examples, gas leak 110 is the result of intentional gas venting from tank 101.

Imaging camera 121 is representative of one or more imaging systems to view tanks 101-103 and generate videos depicting tanks 101-103. In this example, camera 121 generates infrared and/or optical video images depicting tanks 101-103, however in other examples, camera 121 may employ a different type of imaging technology. For example, camera 121 may instead comprise an ultraviolet imaging system. It should be understood that natural gas leaks are difficult to view in the visual light spectrum. As such, camera 121 typically comprises imaging technology for generating images in non-visible spectrums (e.g., infrared). Although camera 121 is illustrated as a single imaging device, in some examples camera 121 may comprise multiple imaging devices. The multiple cameras of camera 121 may include a combination of optical, infrared, and/or laser cameras and imaging devices to improve the gas leak detection. Imaging camera 121 may also include distance metric devices like laser rangefinders to estimate the distance between gas leak 110 and camera 121 to improve leak estimation. Imaging camera 121 transfers the videos depicting tanks 101-103 to model computer 131. Camera 121 is mounted on camera mount 122. Although camera mount 122 is depicted as a pole, camera mount 122 may comprise a different type of mounting structure or camera 121 may use no mounting structure at all. Camera mount 122 may include a pan and tilt system that moves the camera in multiple directions and orientations to cover a wider range and stabilize the field of view. Camera mount 122 may comprise a controller to move camera 121 to pre-defined views and control the direction of camera 121 to provide a 360-degree field of view with camera 121. The controller of camera mount 122 may receive instructions (e.g., from model computer 131) and responsively position camera 121 to find gas leak 110 and stay on view of gas leak 110.

Model computer 131 is representative of one or more computing devices configured to receive video data from camera 121 and telemetry data from sensors 104 and to identify the presence of gas leak 110. The one or more computing devices of model computer 131 host machine learning model 132. For example, computer 131 may comprise an application specific circuit configured to implement a machine learning model. Model computer 131 may additionally host interfacing applications to receive and preprocess the video and telemetry data from camera 121 and sensors 104. The interfacing applications may vectorize the received data to configure the data for ingestion by model 132. For example, vectorization may comprise a feature extraction process to numerically represent the received data. In some examples, computer 131 may generate feature vectors that represent individual pixels of the video data received from camera 121.

Machine learning model 132 comprises any machine learning model implemented within environment 100 as described herein to detect the presence of gas leaks. A machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can identify the presence of gas leaks in environment 100. Model 132 may comprise algorithms to detect background environments, to detect motion, to detect equipment, to classify gas leaks, and/or other types of machine learning algorithms. Examples of machine learning algorithms that may be employed solely or in conjunction with one another include Three Dimensional (3D) deep leaning models, 3D convolutional neural networks, times series convolutional deep learning, transformers, multi-layer perceptron, long term short memory, and attention based deep learning model. Other exemplary machine learning algorithms include artificial neural networks, nearest neighbor methods, ensemble random forests, support vector machines, naïve Bayes methods, linear regressions, or similar machine learning techniques or combinations thereof capable of predicting output based on input data. Machine learning model 132 may be deployed on premises in environment 100 (e.g., proximate to tanks 101-103) or at a remote location in the cloud.

Machine learning model 132 may be trained to detect gas leaks using videos generated by camera 121. For example, camera 121 may transfer the training video images to user computer 141. A user may then annotate image frames of the video to create a training data set. The user may also combine environment and equipment information in the training data set. The annotations classify or segment portions of the image frames. For example, the annotations may classify a portion of the images as storage tanks 101-103, another portion of the images as a gas leak, and another portion of the images as background environment. User computer 141 transfers the training data to model computer 131 to train model 132. Computer 131 receives and vectorizes the training data. Model 132 ingests the training data and trains its constituent machine learning algorithms to detect gas leak 110 using the training data.

User computer 141 is representative of one or more computing devices configured to display application 142 via a Guided User Interface (GUI). User computer 141 comprises one or more computing devices, display screens, touch screen devices, tablet devices, mobile user equipment, keyboards, and the like. User computer 141 is operatively coupled to model computer 131. User computer 141 may be deployed at a remote location, on premises in environment

100 (e.g., proximate to tanks 101-103), or both. User computer 141 and model computer 131 may be located at different geographic locations. Alternatively, user computer 141 may be co-located with model computer 131. Application 142 comprises a user interface application to display gas leak footage (e.g., pictures and/or video), gas leak metrics (e.g., leak probability and/or leak flow rate), and/or other visual/textual elements that characterize gas leaks detected in environment 100 based on machine learning outputs generated by model 132. In this example, application 142 is illustrated comprising visual elements for leak footage and leak metrics, however in other examples, application 142 may comprise different or additional visual elements. User computer 141 may send some or all of the model results to cloud service 151 to distribute the leak indication results for other use cases including reporting, saving historical data, presentation, and/or combining with different models or databases.

Sensors 104, camera 121, model computer 131, user computer 141, and cloud services 151 communicate over various communication links using communication technologies like Institute of Electrical and Electronic Engineers (IEEE) 802.3 (ENET), IEEE 802.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The communication links comprise metallic links, glass fibers, radio channels, or some other communication media. The links use ENET, WIFI, virtual switching, inter-processor communication, bus interfaces, and/or some other data communication protocols.

Sensors 104, camera 121, model computer 131, user computer 141, and cloud services 151 comprise microprocessors, software, memories, transceivers, bus circuitry, and the like. The microprocessors comprise Central Processing Units (CPUs), Graphical Processing Units (GPUs), Digital Signal Processors (DSPs), Application-Specific Integrated Circuits (ASICs), Field Programmable Gate Arrays (FPGAs), analog computing circuits, and/or the like. The memories comprise Random Access Memory (RAM), flash circuitry, Hard Disk Drives (HDDs), Solid State Drives (SSDs), Non-Volatile Memory Express (NVMe) SSDs, and/or the like. The memories store software like operating systems, user applications, networking applications, machine learning applications, and the like. The microprocessors retrieve the software from the memories and execute the software to drive the operation of environment 100 as described herein.

In some examples, environment 100 implements process 200 illustrated in FIG. 2. In some examples, environment 100 implements process 300 illustrated in FIG. 3. It should be appreciated that the structure and operation of environment 100 may differ in other examples.

FIG. 2 illustrates process 200. Process 200 comprises a leak detection process in a natural gas extraction and storage environment. In other examples, process 200 may differ. Process 200 may be implemented in program instructions in the context of any of the software applications, imaging components, module components, machine learning components, or other such elements of one or more computing devices. The program instructions direct the computing device(s) to operate as follows, referred to in the singular for the sake of clarity.

In operation, process 200 begins by viewing natural gas storage systems and generating video footage depicting the natural gas storage systems (step 201). The operation continues by generating feature vectors that represent the video footage (step 202). The operation continues by running machine learning gas leak detection models to generate a machine learning output which may indicate a gas leak (step 203). The operation continues by processing a machine learning output that indicates the presence of a gas leak (step 204). The operation continues by sending the output to different user interfaces or locations using some communication channels and protocols (step 205). The operation continues by displaying the machine learning output on a user interface (step 206). The operation continues by transferring an alert (step 207).

Referring back to FIG. 1, environment 100 includes a brief example of process 200 as employed by one or more applications hosted by the various computing, camera, and sensor devices comprising environment 100.

In operation, camera 121 views tanks 101-103 and their surrounding environment. For example, camera mount 122 may rotate camera 121 to focus the field of view of camera 121 on tanks 101-103. Camera 121 generates video footage by viewing tanks 101-103 (step 201). The video footage comprises a sequence of infrared and/or optical image frames that form a video depicting tanks 101-103 and their surrounding environment. Camera 121 transfers video footage to model computer 131. Camera 121 may transfer the video footage to computer 131 over wired links or over wireless links using wireless networking protocols like Bluetooth. Concurrently, sensors 104 generate telemetry data like temperature, pressure, and venting status for tanks 101-103 and generate telemetry data for the environment like windspeed, pressure, temperature, and the like. For example, a valve indicator of sensors 104 may be attached to tank 101 and generates telemetry data that indicates when tank 101 is intentionally venting gas. Sensors 104 transfer the telemetry data to model computer 131.

Model computer 131 receives video footage and telemetry data from camera 121 and sensors 104. Model computer 131 vectorizes the received data to configure the video footage and the telemetry data for ingestion by machine learning model 132 (step 202). Model computer 131 may host an interface application to vectorize the received data. For example, the interface application may implement a feature extraction process on the video footage. The feature extraction processes may comprise assigning numeric values to each pixel in the images that comprise the video footage. The interface application may group the numeric values of corresponding pixels from different ones of the video frames to generate feature vectors. Once generated, the interface application may transfer the feature vectors to machine learning model 132.

Machine learning model 132 ingests and processes the feature vectors representing the video footage and the telemetry data using its constituent machine learning algorithms (step 203). Machine learning model 132 comprises background detection algorithms, motion detection algorithms, equipment detection algorithms, segmentation algorithms, and leak identification algorithms. Machine learning model 132 generates a machine learning output that indicates the presence or lack thereof of gas leak 110 on storage tank 101. For example, machine learning model 132 may utilize its background detection algorithms to identify the background environment (e.g., area surrounding tanks 101-103) in the video footage and subtract the background environment from the video footage. The background detection algorithms may perform two distinct background environment subtractions for long term and short-term portions of the video. For example, the background detection algorithms may identify the background based on 500 image frames of the video footage to perform the long-term background environment subtraction and identify the background based on 30 image frames of the video footage to perform the short-term background environment subtraction.

Model 132 utilizes its motion detection algorithms to identify motion within the video footage. The motion detection algorithms identify differences in corresponding pixels of different frames in the video to identify the motion. For example, model 132 may identify a first pixel in a first image frame and a corresponding first pixel in a consecutive second image frame and identify motion when the corresponding first pixels in the two frames differ. Model 132 utilizes its equipment detection algorithm to locate tanks 101-103 in the video footage. Model 132 utilizes its leak identification algorithms to determine the presence of gas leak 110. The gas leak identification algorithm may determine the probability that the detected motion comprises a gas leak based on the long-term background subtraction, the short-term background subtraction, the detected motion, the motion duration, the equipment location, and the telemetry data.

Machine learning model 132 uses image segmentation and object detection models to identify equipment and objects in the video footage. Object detection algorithms identify part of the image as segments that correspond to specific devices, people, cars, equipment, and the like. For example, model 132 may identify a group of pixels in a frame that corresponds to a segment that can be identified by a human as a known object. Model 132 utilizes object detection model to reduce false positive from the gas leak detection and correlate the leaks to specific object that may cause the leak.

When the gas leak probability exceeds a threshold value, the leak identification algorithm classifies the detected motion (in this example representing gas leak 110) as a gas leak (step 204). For example, the gas leak identification algorithm may determine the motion was not subtracted in the long-term and short-term background subtractions, is co-located with the location of tank 101, and that tank 101 is not currently venting, and in response determine the probability gas leak 110 exists is very high (e.g., 95% probability). Model 132 generates a machine learning output that indicates the presence of gas leak 110, the probability leak 110 exists, the location of leak 110 and tank 101, and the estimated flowrate of gas leak 110. Model 132 transfers the machine learning output to user computer 141 that indicates the presence of gas leak 110 (step 205). In some examples, model 132 may detect multiple gas leaks. Model 132 may classify the multiple gas leaks as a single gas leak based on their proximity, duration, and time of observation. The leak can also have probability in time, meaning that if the leak is detected longer in time, then its probability of true detection is higher vs leaks that are detected in very short period of time which will assign as low probability leak.

User computer 141 receives and processes the machine learning output and application 142 displays video footage and leak metrics indicated by the machine learning output (step 206). For example, the leak footage may comprise a video with portions of the video depicting gas leak 110 highlighted by model 132. The leak metrics may comprise metrics like leak rate and probability of the leak occurring. Application 142 receives user inputs via user computer 141 to transfer an alert to respond to the gas leak. Application 142 transfers the alert (e.g., to on-site personnel) to confirm the presence of and respond to gas leak 110 on tank 101 (step 207). For example, the alert may comprise the location of tank 101, indicate the presence of leak 110 on tank 101, the time/date the leak was detected, and/or other information to facilitate a response to gas leak 110. Although model 132 is configured for gas leak detection, in other examples model 132 may be configured to detect liquid leaks, detect smoke, detect fire, and/or monitor equipment.

Advantageously, environment 100 effectively utilizes machine learning systems to detect natural gas leaks in natural gas extraction, transfer, and storage equipment. Moreover, environment 100 employs machine learning model 132 to ingest infrared or optical videos depicting storage tanks 101-103 and identify natural gas leak 110 based on the infrared or optical videos.

Figure 3:
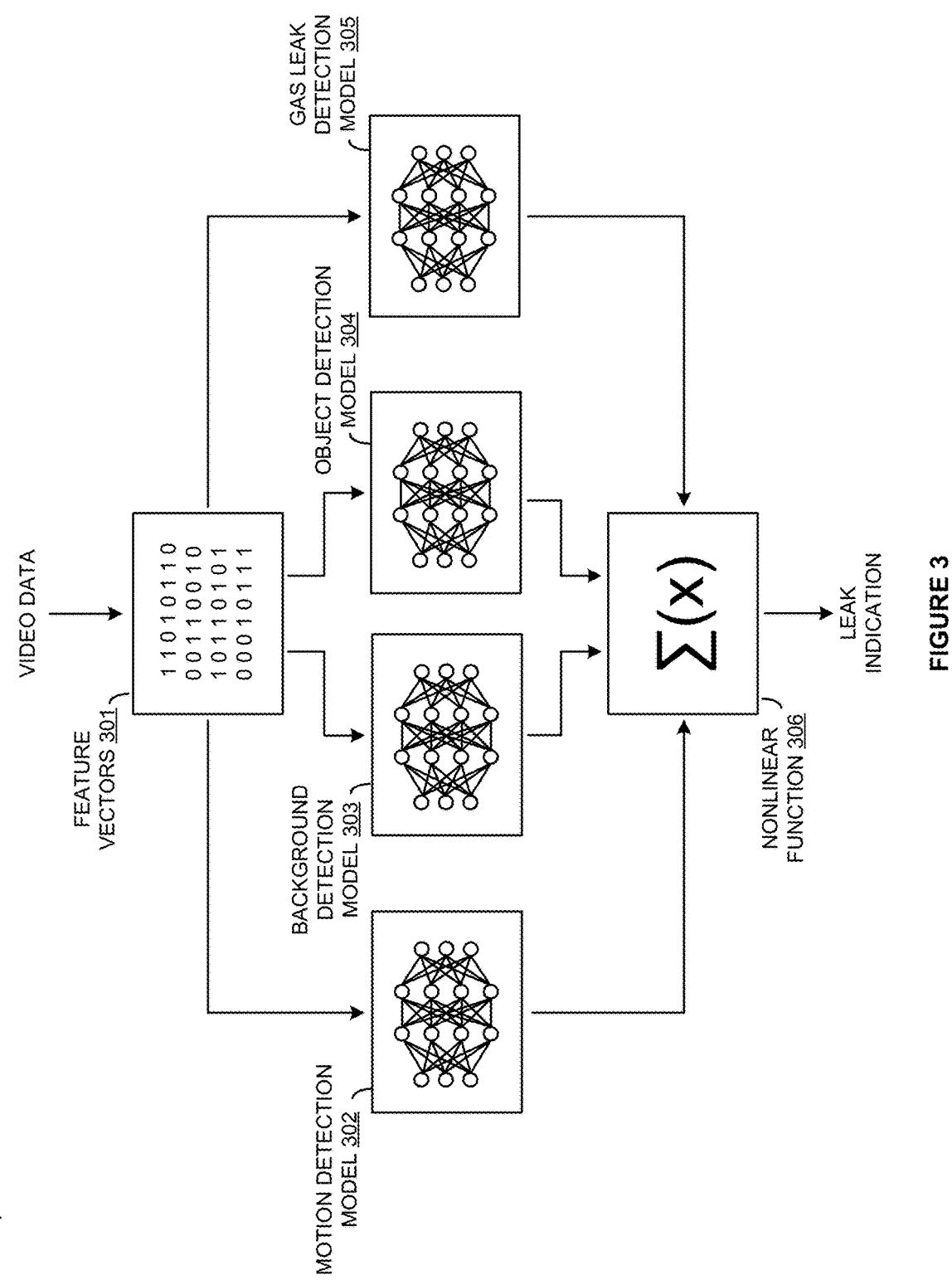
FIG. 3 illustrates an exemplary leak detection block diagram.

FIG. 3 illustrates process 300 to detect gas leaks in a natural gas extraction and storage environment. In other examples, process 300 may differ. Process 300 is illustrated as a functional block diagram and includes feature vectors block 301, motion detection model block 302, background detection model block 303, object detection model block 304, gas leak detection model block 305, and non-linear function block 306. Process 300 may be implemented in program instructions in the context of any of the software applications, imaging components, module components, machine learning components, or other such elements of one or more computing devices. Feature vectors 301 are representative of machine learning inputs to models 302-305 that comprise a numerical representation of infrared or optical video data that depicts a natural gas extraction and/or storage environment. Motion detection model 302 comprises a machine learning model trained to ingest feature vectors 301 and identify motion in the infrared or optical video data. Background detection model 303 comprises a machine learning model trained to ingest feature vectors 301 and identify the background environment in the infrared or optical video data. Object detection model 304 comprises a machine learning model trained to ingest feature vectors 301 and segment the image in the infrared or optical video data to identify and classify natural gas storage, extraction, and or transfer equipment. Gas leak detection model 305 comprises a machine learning model trained to ingest feature vectors 301 and identify gas leaks in the infrared or optical video data. Nonlinear function 306 comprises a machine learning model configured to ingest outputs from models 302, 303, 304, and 305 and generate a gas leak probability indication. Models 302-305 and function 306 may be hosted by the same computing device or different computing devices.

In operation, a computing device receives infrared or optical video data depicting the natural gas storage environment. The computing device vectorizes the infrared or optical video data to generate feature vectors 301. For example, the computing device may numerically represent the pixels in the image frames that comprise the infrared video data and form the feature vectors using the numeric representations. Motion detection model 302, background detection model 303, object detection model 304, and gas leak detection model 305 each ingest feature vectors 301.

Motion detection model 302 determines regions of the infrared or optical video data that depict motion, including motion representing a gas leak in the infrared or optical video data. For example, motion detection model 302 may compare corresponding pixels in sequential video frames of the infrared or optical video data to identify changes between the corresponding pixels (e.g., changes in color). Model 302 may then classify the identified changes in the pixels as motion depicted in the infrared or optical video data.

As stated above, the infrared or optical video data depicts a natural gas storage environment. The storage environment comprises machinery and equipment that extract, store, and transport natural gas. The machinery and equipment that extract, store, and transport natural gas are viewable in the infrared or optical video data and may develop gas leaks that are also viewable in the infrared or optical video data. Other features depicted in the infrared or optical video data may be classified as background environment. Exemplary background environment comprises the sky, the ground, plant and animal life, equipment not associated with gas extraction (e.g., an automobile), buildings, and the like. Background detection model 303 determines regions of the infrared or optical video data that depict the background environment. For example, background detection model 303 may compare corresponding pixels in sequential video frames of the infrared or optical video data to identify regions of the infrared or optical video data that are relatively unchanging to identify the background environment. Background detection model 303 may perform long-term and short-term background detection. Long-term background detection may comprise a background detection process using 500 frames of infrared or optical video data. The short-term background detection may comprise a background detection process using 30 frames of infrared or optical video data. Background detection model 303 may combine short and long-term background detection analysis to fully identify the background environment depicted in the infrared or optical video data.

Object detection model 304 ingests the feature vectors that represent the infrared or optical video data and segments parts of the frames that correspond to a known object in the field of view of the camera. Using object detection helps reduce gas leak detection false positive and relates each leak with some probability to an actual device in the field. Understanding which device is causing the leak helps to better manage and focus on design and deployment of different devices. Object detection model 304 generates an output that indicates regions of the infrared or optical video data that comprise natural gas extraction, storage, and transfer equipment.

Gas leak detection model 305 ingests the feature vectors that represent the infrared or optical video data and identifies the movement in the video data that is corresponding to a leak. Gas leak detection model 305 detects a segment of an image in series of images as a leak based on the similarity of movement to a gas. Gas leak detection model 305 may calculate the flowrate of the gas leak based on distance of the camera to the leak, speed of leak movement in the video, pixel resolution of the video, and environmental conditions like wind speed and direction.

Motion detection model 302, background detection model 303, object detection model 304, and gas leak detection model 305 transfer their machine learning outputs to a nonlinear function 306. Nonlinear function 306 is a machine learning model that is configured to combine the machine learning outputs generated by models 302-305 to determine and infer the presence of a gas leak. Nonlinear function 306 subtracts the portions of the infrared or optical video data identified as background environment from the portions of the infrared or optical video data identified as depicting motion to identify all regions of the video data that depict motion that is not part of the background environment. For example, this may subtract portions of the video data that depict the motion of clouds. Nonlinear function 306 then subtracts regions of the infrared or optical video depicting equipment from the remainder resulting from the background subtraction to identify all regions of the video data that depict both motion and natural gas equipment. Nonlinear function 306 then compares the remainder of the image resulting from the equipment subtraction and the background subtraction to the region of the video data identified by gas leak detection model 305 as a possible gas leak. When the remainder of the video data resulting from the subtractions overlaps with the region of the video data identified by gas leak detection model 305 as a possible gas leak, nonlinear function 306 confirms the presence of a gas leak. Generally, motion depicted by the infrared or optical video data that is not part of the background environment, that is co-located with a piece natural gas equipment, and that has been identified as a possible gas leak by detection model 305 may be classified as a gas leak. By performing multiple image subtractions, nonlinear function 306 inhibits false-positive gas leak detection by detection model 305. Nonlinear function 306 outputs an indication of as to whether a gas leak has been detected in the infrared or optical video data. The indication may comprise a probability/confidence metric regarding the existence of the gas leak (e.g., 85% chance detected leak is real). The indication may comprise a gas flow rate estimate for the detected gas leak and equipment identification numbers to indicate the location of the gas leak. Nonlinear function 306 transfers the gas leak indication to user computing systems for review by human operators.

Figure 4:
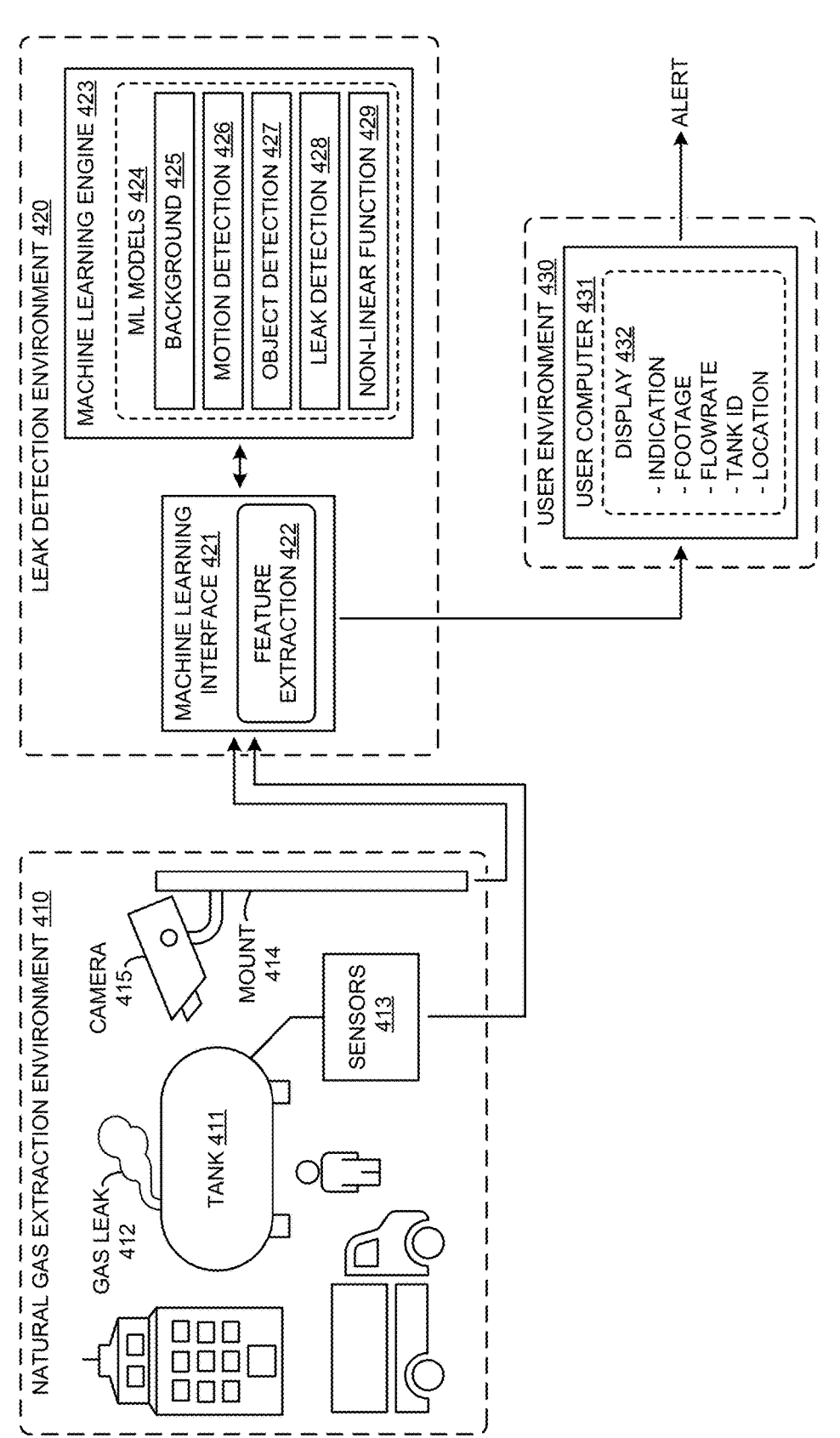
FIG. 4 illustrates an exemplary natural gas leak detection system.

FIG. 4 illustrates environment 400 to detect gaseous leaks in natural gas storage, transfer, and extraction equipment. Environment 400 comprises an example or environment 100, however environment 100 may differ. Environment 400 comprises natural gas extraction environment 410, leak detection environment 420, and user environment 430. Natural gas extraction environment 410 comprises tank 411, leak 412, sensors 413, mount 414, and camera 415. Leak detection environment 420 comprises machine learning interface 421 and machine learning engine 423. Machine learning interface hosts feature extraction application 422. Machine learning engine hosts machine learning (ML) models 424 which comprise background detection model 425, motion detection model 426, object detection model 427, leak detection model 428, and non-linear function model 429. User environment 430 comprises user computer 431 and display 432. In other examples, environment 400 may include fewer or additional components than those illustrated in FIG. 4. Likewise, the illustrated components of environment 400 may include fewer or additional components, assets, or connections than shown.

Natural gas extraction environment 410 is representative storage facility for natural gas. Tank 411 comprises a bullet tank that stores gas and comprises a defect that allows the stored gas to escape as gas leak 412. In this example, the defect comprises a defective gasket. As illustrated in FIG. 4, environment 410 comprises other objects like a building, truck, and human operator. Sensors 413 is representative of a sensor suite comprising an on/off venting indicator, a tank thermometer, an environment thermometer, a tank pressure gauge, an atmospheric barometer, environmental hygrometer, and a wind gauge. A portion of sensors 413 are coupled to tank 411 via wired links. For example, the on/off venting indicator, tank thermometer, and tank pressure gauge may be mounted directly on tank 411 while the remaining sensors may be positioned in the environment proximate to tank 411 (e.g., on a weather station).

Camera 415 comprises a Forward Looking Infrared (FLIR) camera attached to mount 414 via a pan and tilt system. Camera 415 records tank 411 and its surrounding environment including any buildings, vehicles, human operators, and the like. Camera 415 additionally comprises a laser rangefinder to measure distances. The pan and tilt system may rotate camera 415 along a horizontal axis perpendicular to mount 414 and may adjust the roll, yaw, and pitch to focus camera on a desired field of view. The pan and tilt system comprises electric motors, actuators, and the like that operate in response to control signaling received from a device controller. Sensors 413 and camera 415 are communicatively coupled to machine learning interface 421 over wired and/or wireless links. The links may comprise a private Local Area Network (LAN) or may traverse public internet links supported by internet backbone providers.

Machine learning interface 421 comprises a computing device communicatively coupled to sensors 413, camera 415, and machine learning engine 423 that hosts feature extract application 422. Feature extraction application 422 is representative of one or more applications, modules, and the like to process input data received from environment 410 into a consumable format for machine learning models 424. In particular, application 422 generates numeric representations of video frames recorded by camera 415. Application 422 groups the numeric representations into feature vectors and provides the vectors as input to engine 423. Machine learning interface 421 also hosts applications for rendering user interfaces. In particular, the user interface applications generate interfaces to depict outputs from engine 423.

Machine learning engine 423 comprises a computing device that hosts machine learning models 424. Background detection model 425 comprises algorithms trained to detect background environments in video footage depicting natural gas extraction environment 410. Motion detection model 426 comprises algorithms trained to detect movement in video footage depicting natural gas extraction environment 410. Object detection model 427 comprises algorithms trained to classify natural gas storage equipment in video footage depicting natural gas extraction environment 410. Leak detection model 428 comprises algorithms trained to detect possible gas leaks in video footage depicting natural gas extraction environment 410. Non-linear function model 429 comprises algorithms trained to output probability indications for the presence of a gas leak based on the output of the other models.

User computer 431 is a computing device communicatively coupled to machine learning interface 421 that hosts an operating system and one or more user applications to display leak indication outputs received from environment 420. User computer 431 comprises display 432. User computer 431 renders a GUI on display 432 that comprises the leak indication, the infrared video footage, the predicted leak flowrate, tank ID number, and tank location. User computer 431 generates and transfers alerts in response to user input to notify human operators in extraction environment 410 when a gas leak is detected. In some examples, user computer 430 may host machine learning training applications to annotate training data sets to train machine learning models 424 to detect gas leaks in extraction environment 410.

Figure 5:
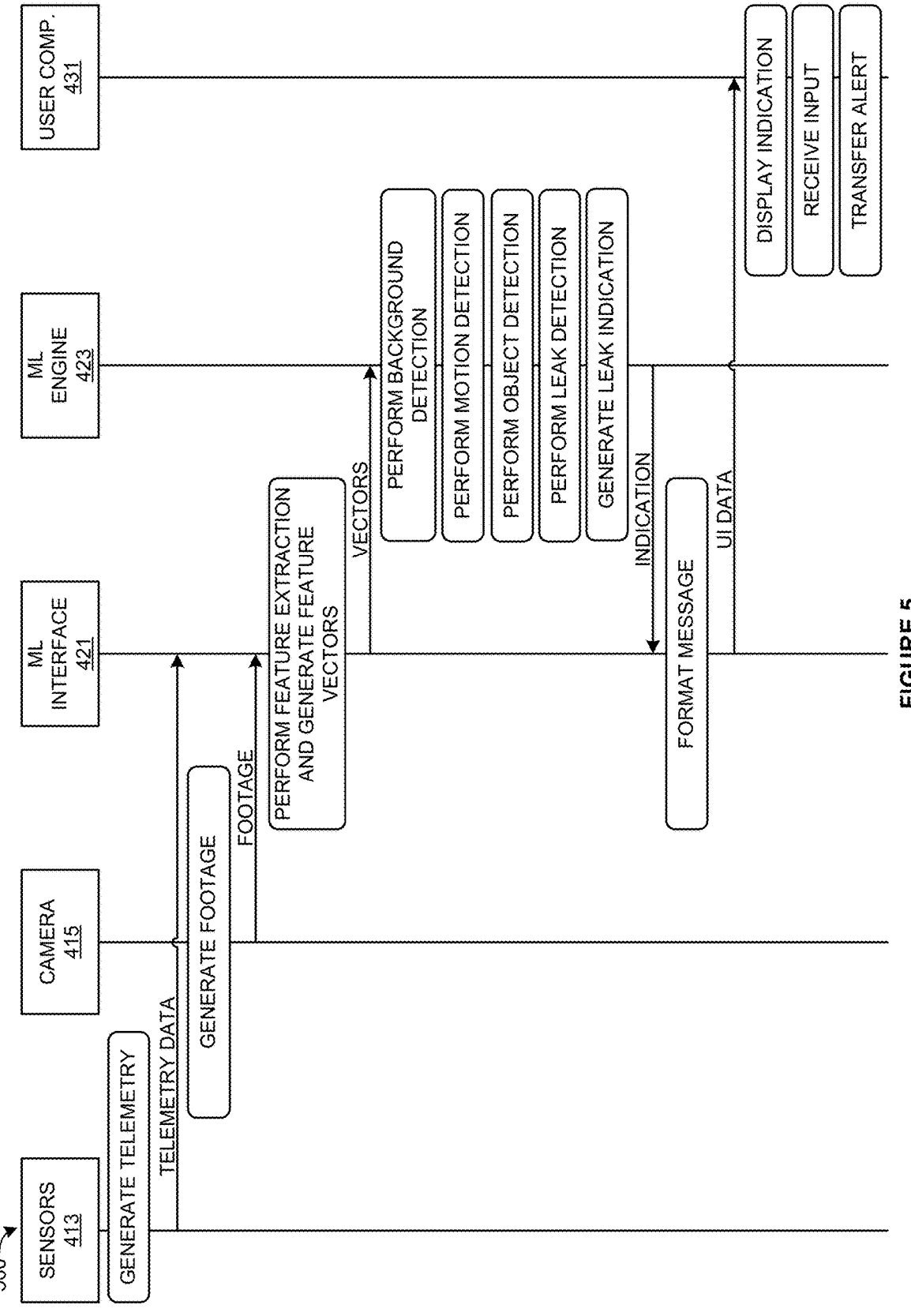
FIG. 5 illustrates an exemplary natural gas leak detection process.

FIG. 5 illustrates process 500. Process 500 comprises an exemplary operation of environment 400 to detect natural gas leak 412 from tank 411. In operation, sensors 413 generate telemetry data for tank 411 and transfer the telemetry data to machine learning interface 421. Sensors 413 detect tank pressure, tank temperature, operator-initiated venting, environmental temperature, environmental pressure, environmental humidity, and environmental wind speed. Sensors 413 generate and transfer telemetry data that comprises the aforementioned sensor measurements. The telemetry data may be reported continuously or discretely. For example, sensors 413 may continuously transfer their measurements or may generate and transfer telemetry reports periodically. Camera 415 records infrared video depicting tank 411 and transfers the video footage to machine learning interface 421. Camera 415 uses its rangefinder to determine the distance between camera 415 and tank 411. At some point in time during the operation of sensors 413 and camera 415, tank 411 develops leak 412. The telemetry data and infrared video footage changes in response to the emergence of leak 412. For example, when leak 412 occurs, the measured tank pressure may decrease, and the leak may be visible in the infrared footage captured by camera 415.

Feature extraction application 422, hosted by interface 421, implements a feature extraction process on the received telemetry data and video footage. Machine learning interface 421 provides the feature vectors to machine learning engine 423. Each of models 425-428 ingests the feature vectors from vectorization application 422. Background detection model 425 processes the feature vectors using its constituent background detection algorithms to identify regions of the infrared video data that depict background portions of extraction environment 410. For example, background detection model 425 may classify the human operator, truck, and building in environment 410 as background. Motion detection model 426 processes the feature vectors using its constituent motion detection algorithms to identify regions of the infrared video data that depict motion in extraction environment 410. For example, motion detection model 426 may classify the movements of human operator, the movement of the truck, and gas leak 412 in environment 410 as motion. Object detection model 427 processes the feature vectors using its constituent object detection algorithms to identify regions of the infrared video data that depict natural gas storage equipment in extraction environment 410. For example, object detection model 427 may classify tank 411 in environment 410 as natural gas storage equipment. Leak detection model 428 processes the feature vectors using its constituent leak detection algorithms to identify regions of the infrared video data that depict natural gas leaks in extraction environment 410. For example, object detection model 427 may classify gas leak 412 in environment 410 as a potential gas leak.

Models 425-428 provide their machine learning outputs to non-linear function model 429. Non-linear function model 429 performs a series of image subtractions to confirm the presence of leak 412. Model 429 subtracts the background detection output, the objection detection output, and the motion detection output from the video footage and compares the remainder to the leak detection output. When the overlap between the leak detection output and the remainder exceeds a threshold value (i.e., 90% overlap), non-linear function model 429 generates an output confirming the presence of leak 412. Model 429 includes contextual information for leak 412 like tank ID number, latitude and longitudinal coordinates, leak flowrate, raw video footage, leak probability, and the like. Model 429 transfers the leak indication to machine learning interface 421. Machine learning interface 421 formats the indication for rendering on the display of user computer 431 and forwards the indication to user computer 431.

User computer 431 displays the indication on display 432. The display includes the indication confirming the existence leak 412, a confidence percentage in the indication, tank GPS coordinates, data and time, and tank ID number. User computer 431 receives a user input to notify extraction environment operators and responsively transfers an alert.

Figure 6:
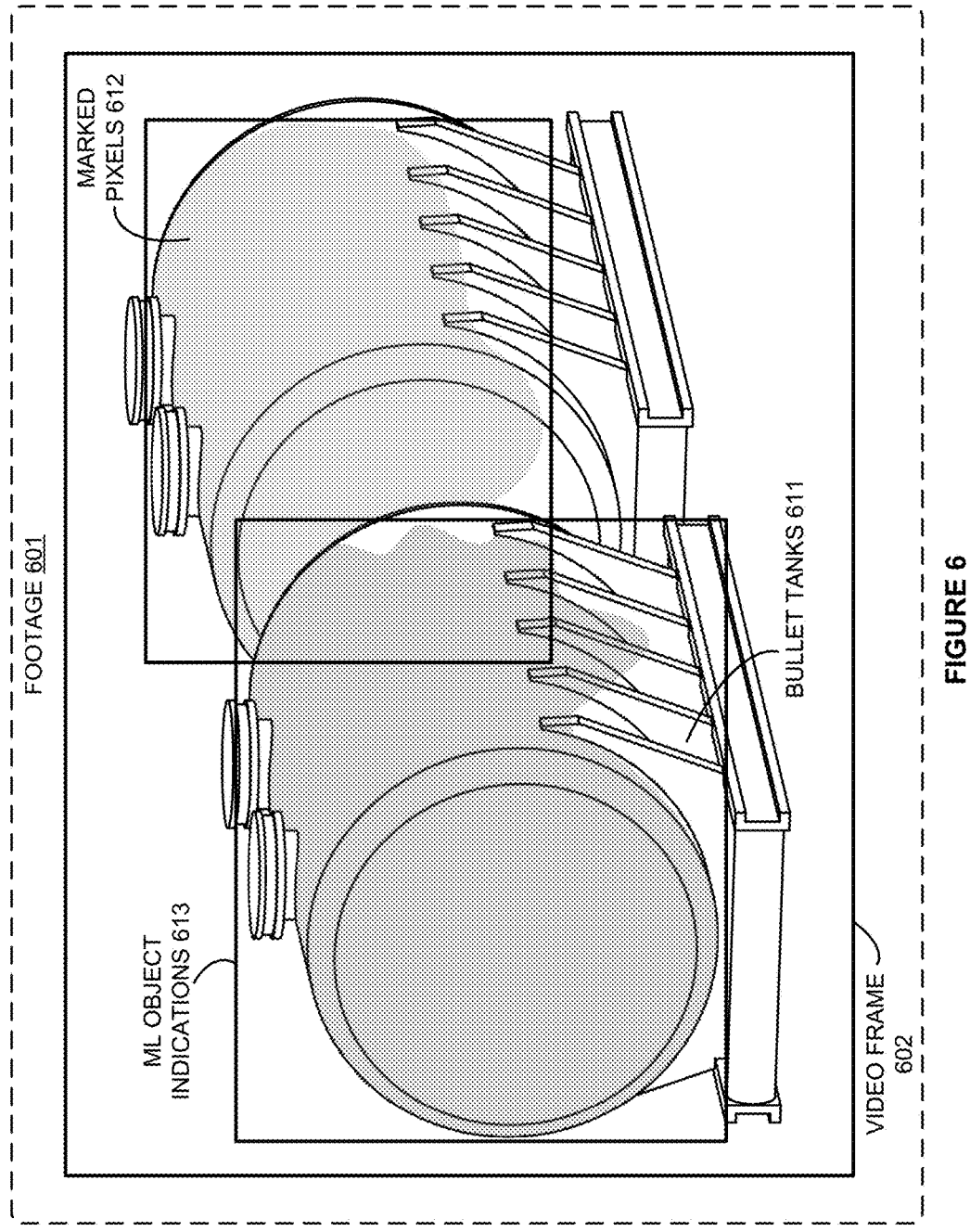
FIG. 6 illustrates an exemplary machine learning training input.

FIG. 6 illustrates model training input 600. Model training input 600 comprises an annotated image to train a machine learning model (e.g., object detection model 427) to identify natural gas storage equipment. Training input 600 comprises footage 601, video frame 602, bullet tanks 611, marked pixels 612, and machine learning object indications 613. Video frame 602 comprises an infrared still frame image from footage 601 of bullet tanks 611. A human operator marks pixels that depict bullet tanks 611. For example, marked pixels 612 may comprise user generated annotations that identify the shape and location of the bullet tanks within the still frame image. The annotations may comprise colored markings. Training input 600 is provided to a machine learning model to advance its constituent algorithms to classify bullet tanks in video images based on marked pixels 612. The model segments the training data to generate machine learning object indications 613 that identify bullet tanks 611. The human operator reviews object indications 613 and either rejects or accepts indications 613 based on their accuracy.

Figure 7:
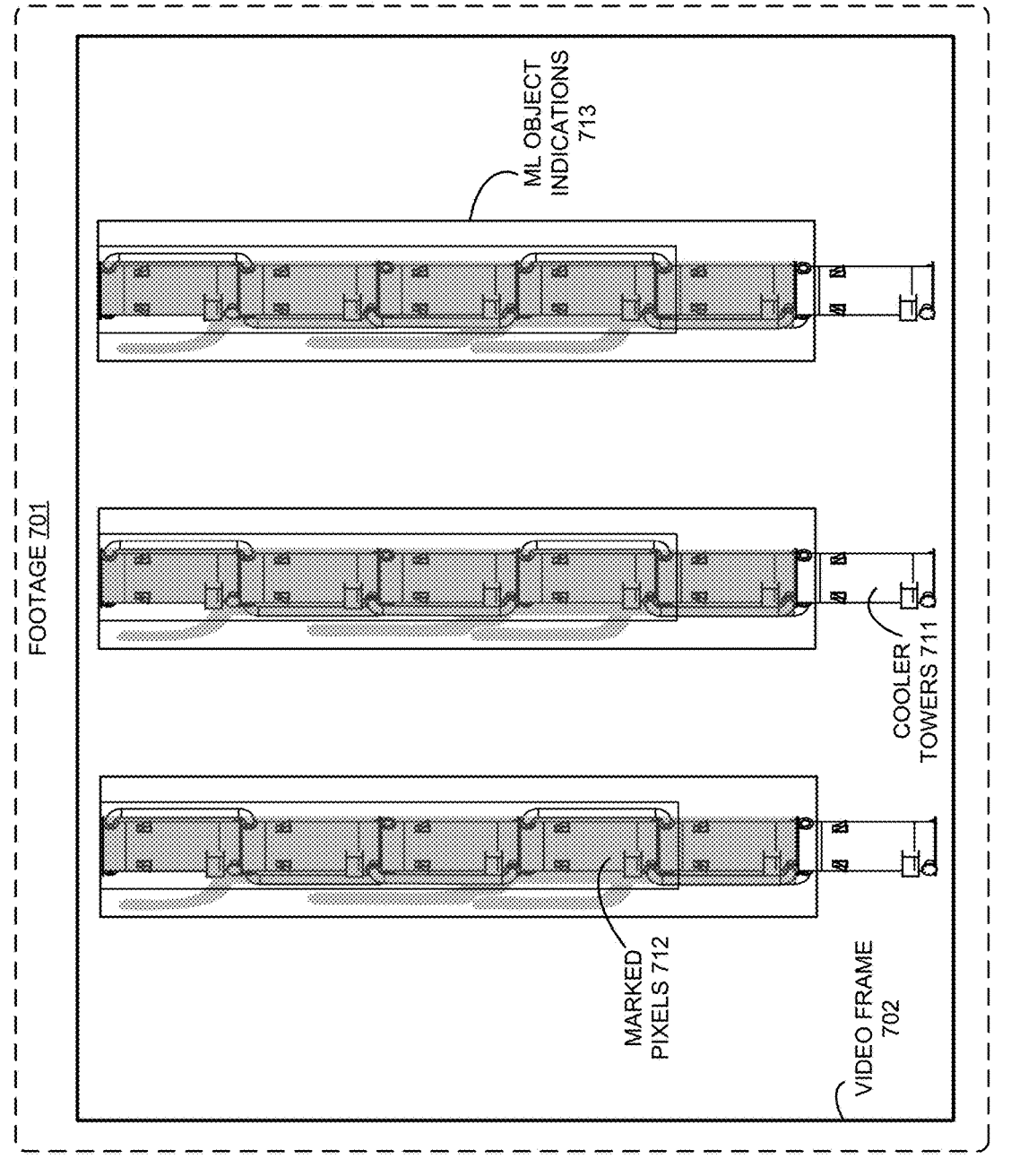
FIG. 7 illustrates an exemplary machine learning training input.

FIG. 7 illustrates model training input 700. Model training input 700 comprises an annotated image to train a machine learning model to identify natural gas storage equipment. Training input 700 comprises footage 701, video frame 702, cooler towers 711, marked pixels 712, and machine learning object indications 713. Video frame 702 comprises an infrared still frame image from footage 701 of cooler towers 711. Similar to training input 600, a human operator marks pixels that depict cool towers 711 with user generated annotations that identify the shape and location of the cooler towers 711 in video frame 702. Training input 700 is provided to a machine learning model to advance its constituent algorithms to classify cooler towers in video images based on marked pixels 712. By providing different types of object detection training inputs to the machine learning model, the machine learning model is able to classify a greater number of natural gas extraction equipment types. In should be appreciated that training inputs 600 and 700 may also be used to train background detection machine learning models (e.g., background detection model 425). For example, inputs 600 or 700 may be provided by a machine learning model to train the model to detect portions of frames 602 or 702 that do not comprise the marked pixels to classify background environments.

Figure 8:
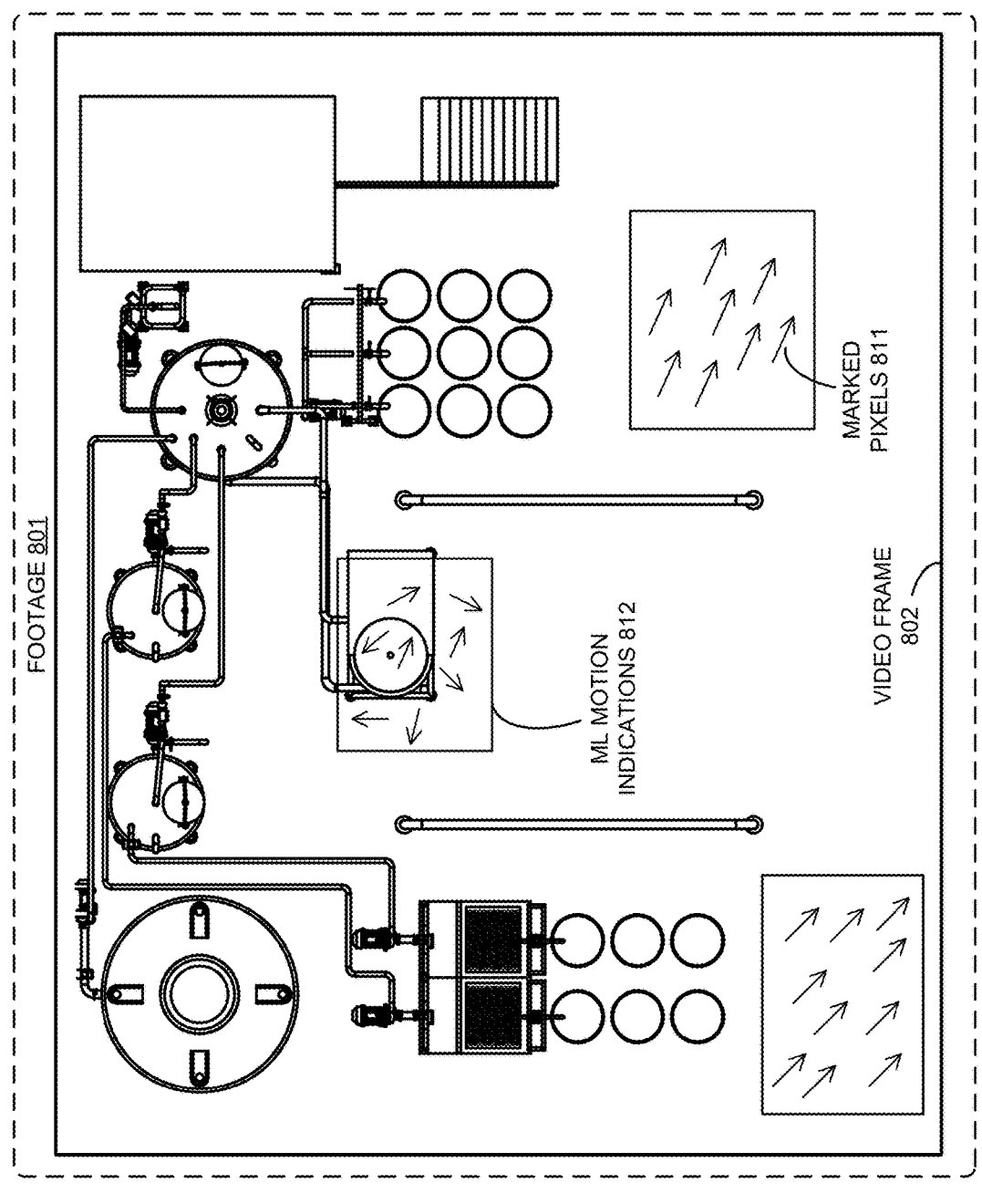
FIG. 8 illustrates an exemplary machine learning training input.

FIG. 8 illustrates model training input 800. Model training input 800 comprises an annotated image to train a machine learning model (e.g., motion detection model 426) to identify motion. Training input 800 comprises footage 801, video frame 802, marked pixels 811, and machine learning indications 812. Video frame 802 comprises an infrared still frame image from footage 801 of natural gas storage site. A human operator marks pixels that depict motion within footage from 801. For example, the human operator may mark environmental motion, human movements, vehicle movements, and natural gas leaks as motion. Alternatively, a computing system may annotate video frame 802. Once annotated, training input 800 is provided to a machine learning model to advance its constituent algorithms to classify motion in video images based on marked pixels 811. The model segments the training data to generate machine learning motion indications 812 that identify the motion depicted in footage 801. The human operator reviews motion indications 812 and either rejects or accepts indications 812 based on their accuracy.

Figure 9:
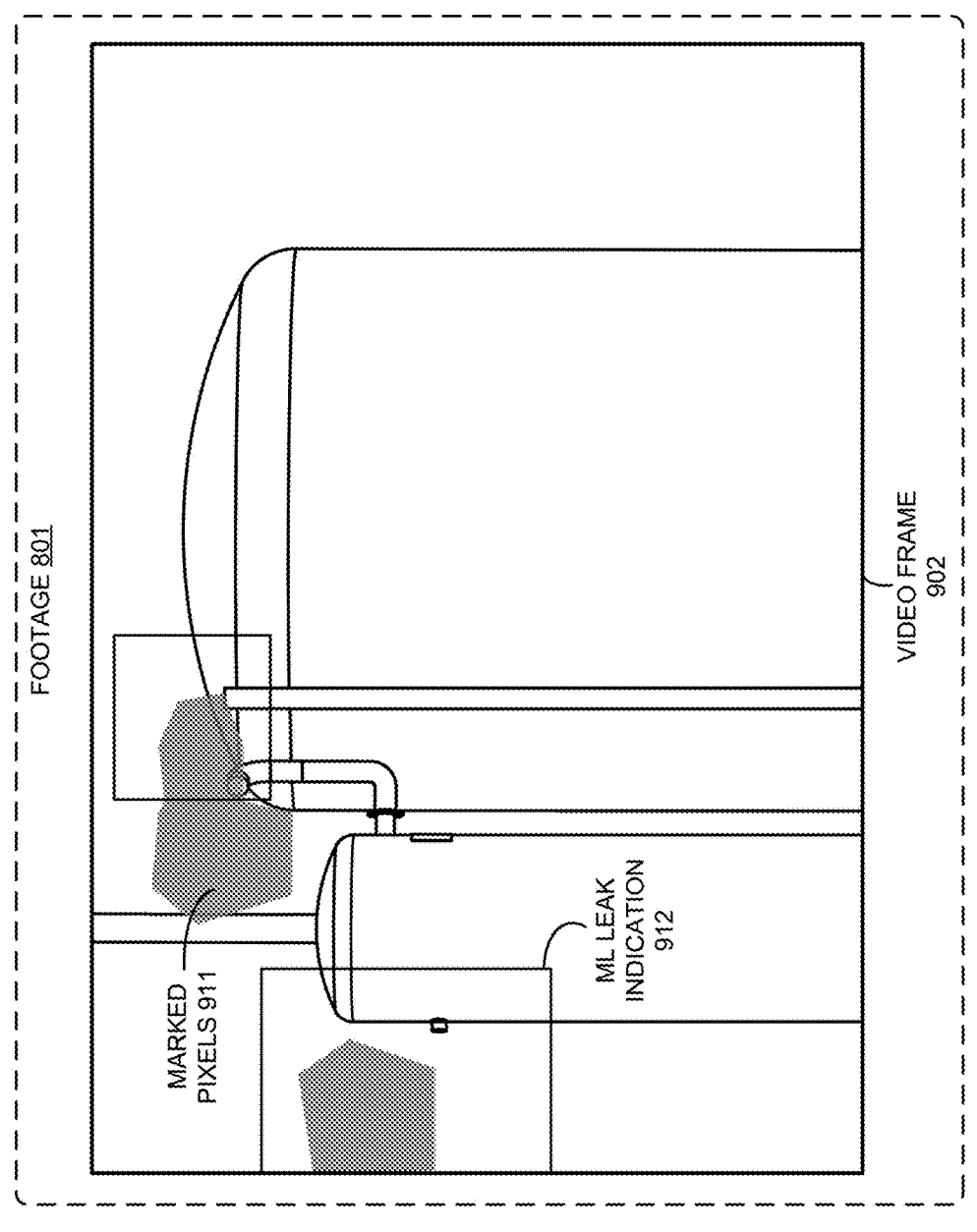
FIG. 9 illustrates an exemplary machine learning training input.

FIG. 9 illustrates model training input 900. Model training input 900 comprises an annotated image to train a machine learning model (e.g., leak detection model 428) to identify natural gas leaks. Training input 900 comprises footage 901, video frame 902, marked pixels 911, and machine learning object indications 912. Video frame 902 comprises an infrared still frame image from footage 901 of a gas leak from a natural gas storage equipment. A human operator annotates the pixels that depict the gas leak to identify the shape, motion, size, and/or other leak characteristics within the still frame image. The annotations comprise colored markings. Training input 900 is provided to a machine learning model to advance its constituent algorithms to classify gas leaks in video images based on marked pixels 912. The model segments the training data to generate machine learning leak indications 912 that identify the gas leak. The human operator reviews leak indications 912 for accuracy.

Figure 10:
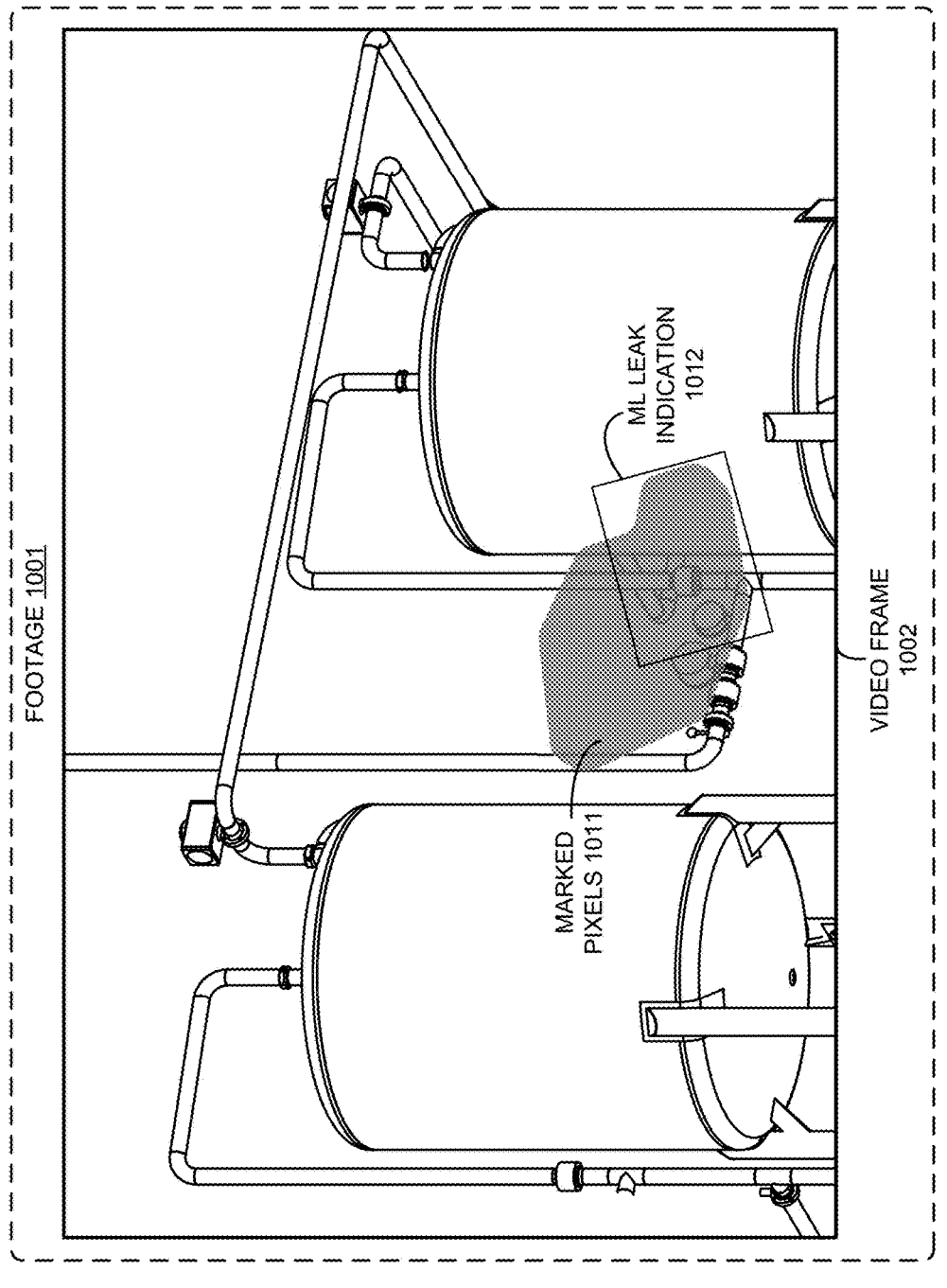
FIG. 10 illustrates an exemplary machine learning training input.

FIG. 10 illustrates model training input 1000. Model training input 1000 comprises an annotated image to train a machine learning model to identify natural gas leaks. Training input 1000 comprises footage 1001, video frame 1002, marked pixels 1011, and machine learning object indications 1012. Video frame 1002 comprises an infrared still frame image from footage 1001 of a gas leak from a natural gas storage equipment. Similar to input 900, training input is annotated to mark the shape, motion, size, and/or other leak characteristics of the gas leak. In should be appreciated that train inputs 600, 700, 800, 900, and 1000 are exemplary and may vary in other examples.

Figure 11:
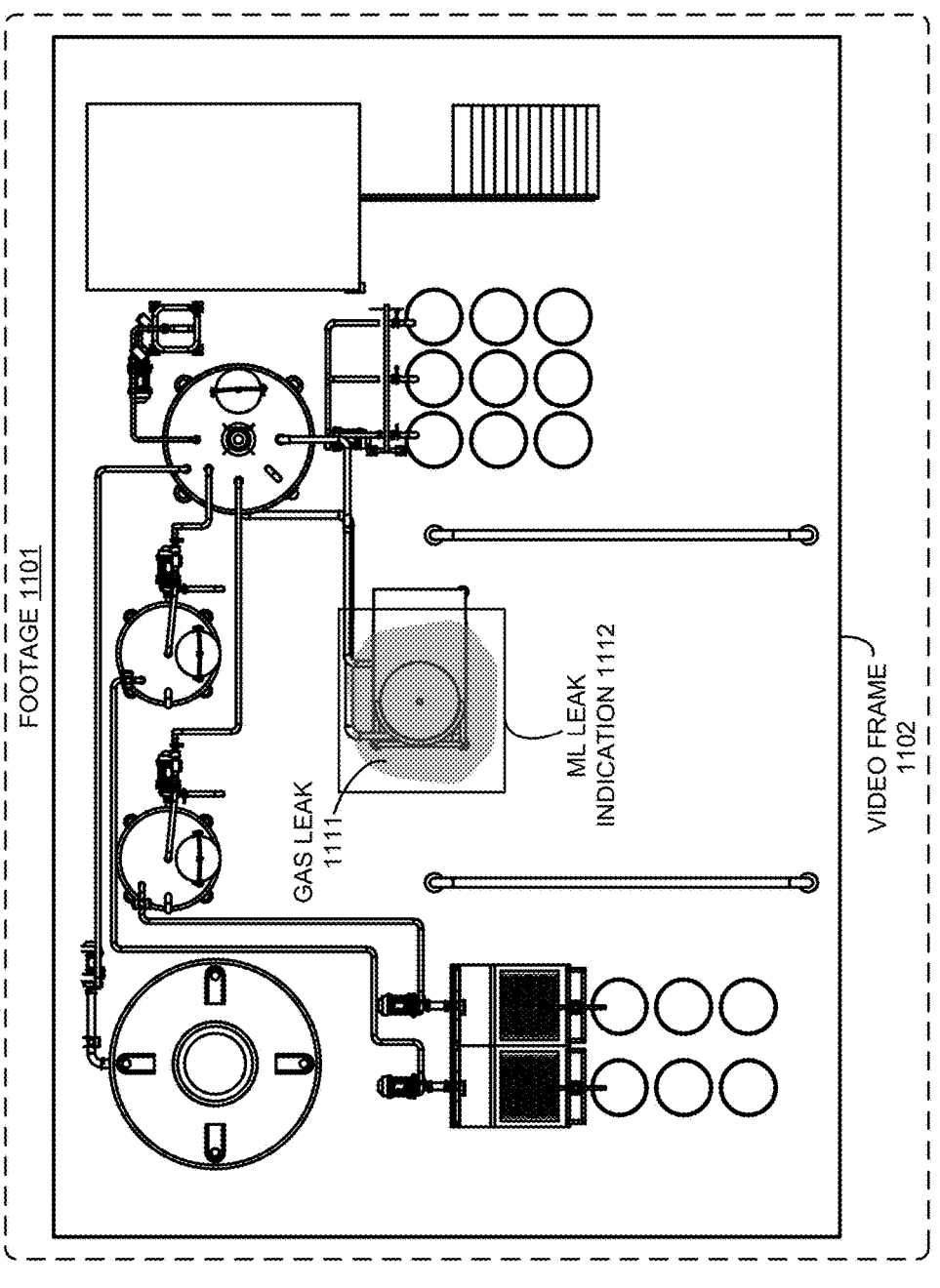
FIG. 11 illustrates an exemplary machine learning leak detection output.

FIG. 11 illustrates model output 1100. Model output 1100 comprises an output from a machine learning model (e.g., non-linear function model 429) that indicates the presence of a gas leak. Model output comprises footage 101, video frame 1102, gas leak 1111, and machine learning leak indication 1112. The machine learning model segments frame 1102 to identify gas leak 1111 with leak indication 1112. For example, the machine learning model may use the leak detection processes described in the preceding Figures to detect gas leak 1111. Model output 1100 may be presented on a user interface to allow human operators to take corrective action.

Figure 12:
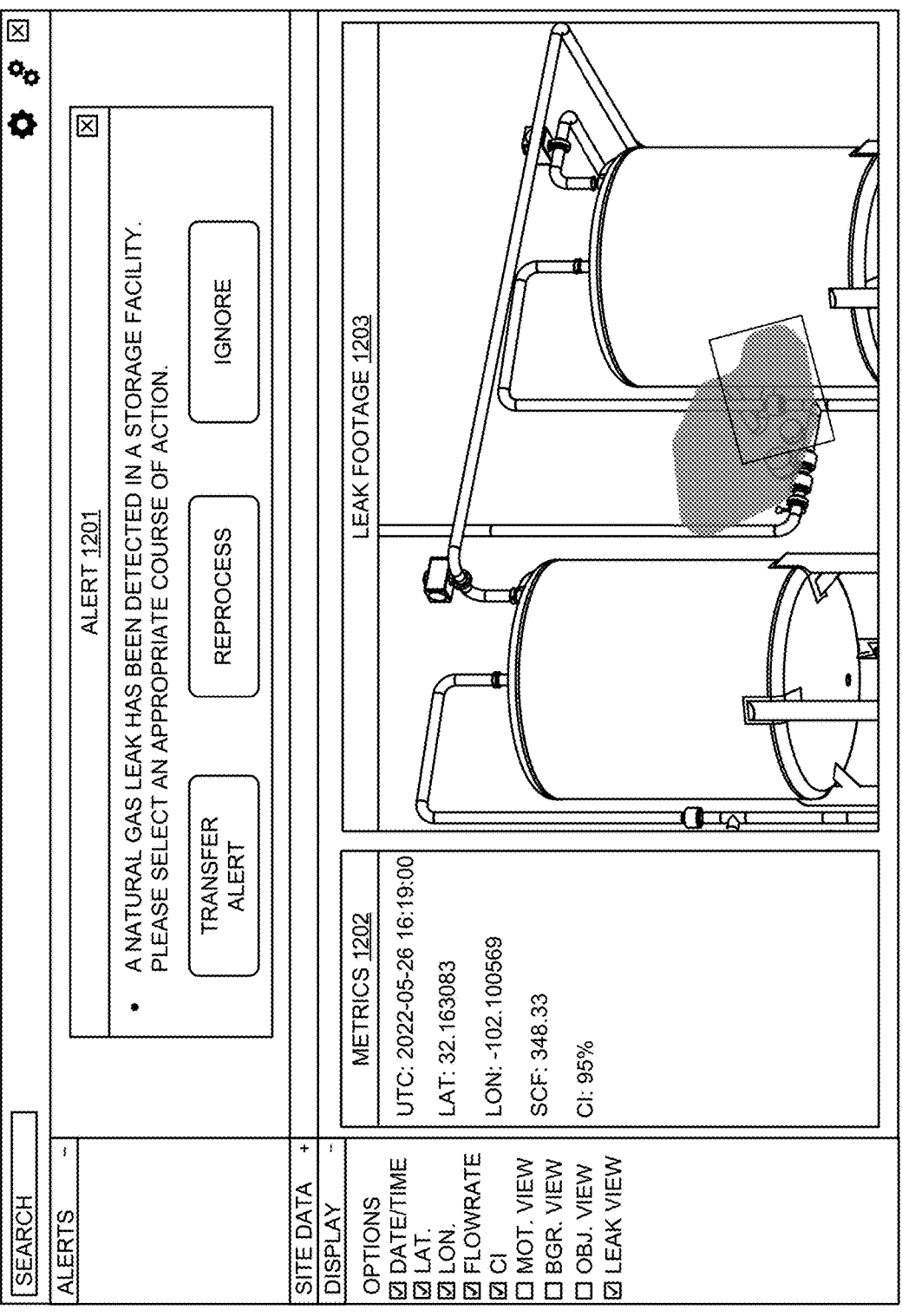
FIG. 12 illustrates an exemplary user interface.

FIG. 12 illustrates user interface 1200. User interface 1200 is an example of application 132 illustrated in FIG. 1 and display 432 illustrated in FIG. 4, however application 142 and display 432 may differ. User interface 1200 comprises alert 1201, metrics 102, and leak footage 1203. Alert 1201 comprises a warning that indicates a natural gas leak has been detected. For example, the computing device that renders user interface 1200 may receive a leak indication generated by a machine learning model trained to detect natural gas leaks and responsively display alert 1201. Alert 1201 comprises selectable options to transfer an alert, to reprocess, or to ignore the alert. Metrics 1202 comprise information like date/time, latitude and longitude coordinates, leak flowrate, and prediction confidence that contextualizes the detected gas leak. Leak footage 1203 comprises video data depicting the detected gas leak. Leak footage 1203 is marked with a box and highlights by the machine learning model to identify the location of the gas leak within the footage. User interface 1200 comprises a set of selectable options on the left-side panel that allows a user to customize the view of leak footage 1203 and the information presented in metrics 1202.

Figure 13:
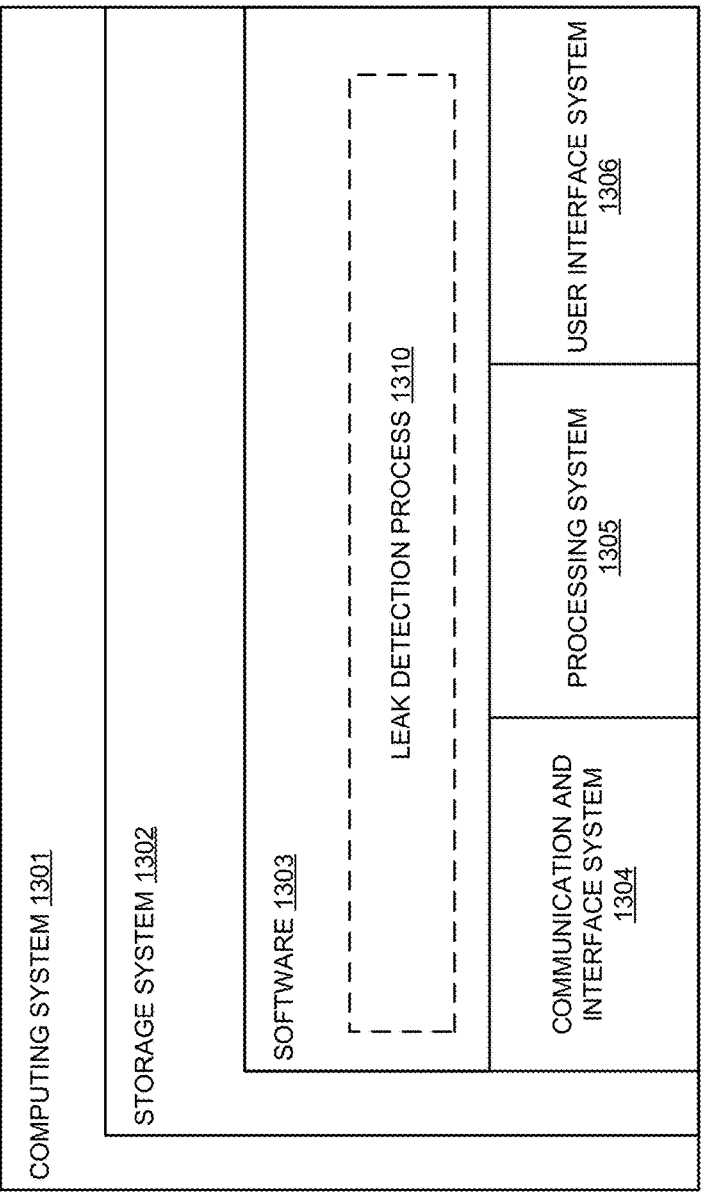
FIG. 13 illustrates an exemplary computing system.

FIG. 13 illustrates computing environment 1300 according to an implementation of the present technology. Computing environment 1300 comprises computing system 1301. Computing system 1301 is representative of any system or collection of systems with which the various operational architectures, processes, scenarios, and sequences disclosed herein for detecting natural gas leaks in natural gas extraction, transfer, and storage environments. For example, computing system 1301 may be representative of model computer 131, user computer 141, machine learning interface 421, machine learning engine 423, user computer 431, and/or any other computing device contemplated herein. Computing system 1301 may be implemented as a single apparatus, system, or device or may be implemented in a distributed manner as multiple apparatuses, systems, or devices. Computing system 1301 includes, but is not limited to, storage system 1302, software 1303, communication interface system 1304, processing system 1305, and user interface system 1306. Processing system 1305 is operatively coupled with storage system 1302, communication interface system 1304, and user interface system 1306.

Processing system 1305 loads and executes software 1303 from storage system 1302. Software 1303 includes and implements leak detection process 1310, which is representative of any of the natural gas leak detection processes described with respect to the preceding Figures, including but not limited to the video imaging, machine learning, leak detection and classification, and user interface operations described with respect to the preceding Figures. For example, leak detection process 1310 may be representative of process 200 illustrated in FIG. 2 and/or process 300 illustrated in FIG. 3. When executed by processing system 1305 to detect natural gas leaks, software 1303 directs processing system 1305 to operate as described herein for at least the various processes, operational scenarios, and sequences discussed in the foregoing implementations. Computing system 1301 may optionally include additional devices, features, or functionality not discussed for purposes of brevity.

Processing system 1305 may comprise a micro-processor and other circuitry that retrieves and executes software 1303 from storage system 1302. Processing system 1305 may be implemented within a single processing device but may also be distributed across multiple processing devices or subsystems that cooperate in executing program instructions. Examples of processing system 1305 include general purpose CPUs, GPUs, DSPs, ASICs, FPGAs, analog computing devices, and logic devices, as well as any other type of processing device, combinations, or variations thereof.

Storage system 1302 may comprise any computer readable storage media readable by processing system 1305 and capable of storing software 1303. Storage system 1302 may include volatile, nonvolatile, removable, and/or non-removable media implemented in any method or technology for storage of information, such as computer readable instructions, data structures, program modules, or other data. Examples of storage media include RAM, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1302 may also include computer readable communication media over which at least some of software 1303 may be communicated internally or externally. Storage system 1302 may be implemented as a single storage device but may also be implemented across multiple storage devices or sub-systems co-located or distributed relative to each other. Storage system 1302 may comprise additional elements, such as a controller, capable of communicating with processing system 1305 or possibly other systems.

Software 1303 (including leak detection process 1310) may be implemented in program instructions and among other functions may, when executed by processing system 1305, direct processing system 1305 to operate as described with respect to the various operational scenarios, sequences, and processes illustrated herein. For example, software 1303 may include program instructions for generating feature vectors that represent a video depicting a natural gas extraction system and generating a machine learning output to identify and classify natural gas leaks in the extraction system as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1303 may include additional processes, programs, or components, such as operating system software, virtualization software, or other application software. Software 1303 may also comprise firmware or some other form of machine-readable processing instructions executable by processing system 1305.

In general, software 1303 may, when loaded into processing system 1305 and executed, transform a suitable apparatus, system, or device (of which computing system 1301 is representative) overall from a general-purpose computing system into a special-purpose computing system customized to detect and classify natural gas leaks in infrared or optical videos using machine learning algorithms as described herein. Indeed, encoding software 1303 on storage system 1302 may transform the physical structure of storage system 1302. The specific transformation of the physical structure may depend on various factors in different implementations of this description. Examples of such factors may include, but are not limited to, the technology used to implement the storage media of storage system 1302 and whether the computer-storage media are characterized as primary or secondary storage, as well as other factors.

For example, if the computer readable storage media are implemented as semiconductor-based memory, software 1303 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1304 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1301 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of computing devices for gas leak detection and classification, it should be understood that the condition systems and methods described herein are not limited to such embodiments and may apply to a variety of other environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method of operating a leak detection system to detect gaseous leaks in a natural gas storage environment, the method comprising:

generating feature vectors based on video data that depicts a natural gas storage facility;

providing the feature vectors as input to a motion detection machine learning model, a background detection machine learning model, an object detection machine learning model, and a gas leak detection machine learning model, wherein:

the motion detection machine learning model indicates a presence or lack thereof of motion in the video data;

the background detection machine learning model indicates a presence or lack thereof of background environment in the video data;

the object detection machine learning model indicates a presence or lack thereof of natural gas extraction, storage, or transfer equipment in the video data;

the gas leak detection machine learning model indicates a presence or lack thereof of a gas leak;

providing a motion detection indication, a background detection indication, an object detection indication, and a gas leak detection indication to a non-linear function machine learning model, wherein the non-linear function machine learning model indicates a likelihood of a presence or lack thereof of the gas leak in the natural gas storage facility;

in response to an indication of the likelihood of the presence or lack thereof of the gas leak in the natural gas storage facility, generating and transferring data for rendering a user interface that comprises the indication.

2. The method of claim 1 wherein:

the video data comprises infrared video data;

generating the feature vectors comprises generating numerical representations of the infrared video data; and providing the feature vectors as the input to the motion detection machine learning model, the background detection machine learning model, the object detection machine learning model, and the gas leak detection machine learning model comprises providing the numerical representations of the infrared video data as the input to the motion detection machine learning model, the background detection machine learning model, the object detection machine learning model, and the gas leak detection machine learning model.

3. The method of claim 1 wherein generating and transferring the data for rendering the user interface that comprises the indication comprises generating and transferring the data for rendering the user interface that comprises the likelihood of the presence or lack thereof of the gas leak, an estimated gas flow rate, and an equipment identification number.

4. The method of claim 1 wherein generating the feature vectors based on the video data comprises generating the feature vectors based on the video data and sensor telemetry data for the natural gas storage facility.

5. The method of claim 1 further comprising generating the video data that depicts the natural gas storage facility.

6. A leak identification system configured to detect gaseous leaks in a natural gas extraction environment, the leak identification system comprising:

a machine learning interface configured to generate feature vectors based on video data that depicts a natural gas storage facility and provide the feature vectors as input to a motion detection machine learning model, a background detection machine learning model, an object detection machine learning model, and a gas leak detection machine learning model;

the motion detection machine learning model configured to ingest the feature vectors and generate a motion detection output that indicates the presence of motion in the video data;

the background detection machine learning model configured to ingest the feature vectors and generate a background detection output that indicates background portions of the video data;

the object detection machine learning model configured to ingest the feature vectors and generate an object detection output that indicates natural gas extraction, storage, or transfer equipment in the video data;

the gas leak detection machine learning model configured to ingest the feature vectors and generate a gas leak detection output that indicates portions of the video data that depict a gas leak;

a non-linear function machine learning model configured to ingest the motion detection output, the background detection output, the object detection output, and the gas leak detection output and utilize a non-linear function machine learning algorithm to generate a non-linear function output that indicates a likelihood of the presence of the gas leak in the natural gas storage facility; and the machine learning interface configured to receive the non-linear function output that indicates the likelihood of the presence of the gas leak in the natural gas storage facility, generate data for rendering a user interface that comprises the indication, and transfer the data.

7. The system of claim 6 wherein:

the video data comprises infrared video data; and the machine learning interface is configured to generate numerical representations of the infrared video data and provide the numerical representations of the infrared video data as the input to the motion detection machine learning model, the background detection machine learning model, the object detection machine learning model, and the gas leak detection machine learning model.

8. The system of claim 6 wherein the machine learning interface is configured to generate and transfer the data for rendering the user interface that comprises the likelihood of the presence or lack thereof of the gas leak, an estimated gas flow rate, and an equipment identification number.

9. The system of claim 6 wherein the machine learning interface is configured to generate the feature vectors based on the video data and sensor telemetry data for the natural gas storage facility.

10. The system of claim 6 further comprising an imaging system configured to generate the video data that depicts the natural gas storage facility.

11. A non-transitory computer-readable medium stored thereon instructions to detect gaseous leaks in a natural gas extraction environment, that, in response to execution, cause a system comprising a processor to perform operations, the operations comprising:

generating feature vectors based on video data that depicts a natural gas storage facility;

providing the feature vectors as input to a motion detection machine learning model, a background detection machine learning model, an object detection machine learning model, and a gas leak detection machine learning model, wherein:

the motion detection machine learning model indicates a presence or lack thereof of motion in the video data;

the background detection machine learning model indicates a presence or lack thereof of background environment in the video data;

the object detection machine learning model indicates a presence or lack thereof of natural gas extraction, storage, or transfer equipment in the video data;

the gas leak detection machine learning model indicates a presence or lack thereof of a gas leak;

providing a motion detection indication, a background detection indication, an object detection indication, and a gas leak detection indication to a non-linear function machine learning model, wherein the non-linear function machine learning model indicates a likelihood of the presence or lack thereof of the gas leak in the natural gas storage facility; and in response to an indication of the likelihood of the presence or lack thereof of the gas leak in the natural gas storage facility, generating and transferring data for rendering a user interface that comprises the indication.

12. The non-transitory computer readable medium claim 11 wherein:

the video data comprises infrared video data;

generating the feature vectors comprises generating numerical representations of the infrared video data; and providing the feature vectors as the input to the motion detection machine learning model, the background detection machine learning model, the object detection machine learning model, and the gas leak detection machine learning model comprises providing the numerical representations of the infrared video data as the input to the motion detection machine learning model, the background detection machine learning model, the object detection machine learning model, and the gas leak detection machine learning model.

13. The non-transitory computer readable medium claim 11 wherein generating and transferring the data for rendering the user interface comprises generating and transferring the data for rendering the user interface that comprises the likelihood of the presence or lack thereof of the gas leak, an estimated gas flow rate, and an equipment identification number.

14. The non-transitory computer readable medium claim 11 wherein generating the feature vectors based on the video data comprises generating the feature vectors based on the video data and sensor telemetry data for the natural gas storage facility.

15. The method of claim 1 further comprising estimating a flow rate of the gas leak.

16. The method of claim 1 further comprising rendering the user interface to display the indication based on the data.

17. The system of claim 6 wherein the gas leak detection machine learning model is further configured to estimate a flow rate of the gas leak.

18. The system of claim 6 further comprising a user computer configured to render the user interface to display the indication based on the data.

19. The non-transitory computer readable medium claim 11 wherein the operations further comprise estimating a flow rate of the gas leak.

20. The non-transitory computer readable medium claim 11 wherein the operations further comprise rendering the user interface to display the indication based on the data.

\* \* \* \* \*